United States Patent
Luo

(10) Patent No.: US 9,451,580 B2
(45) Date of Patent: Sep. 20, 2016

(54) MOBILE TERMINAL AND METHOD FOR OBTAINING LOCATION INFORMATION ABOUT MOBILE TERMINAL

(71) Applicant: ZTE CORPORATION, Shenzhen (CN)

(72) Inventor: Yijun Luo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/436,195

(22) PCT Filed: Jul. 19, 2013

(86) PCT No.: PCT/CN2013/079701
§ 371 (c)(1),
(2) Date: Apr. 16, 2015

(87) PCT Pub. No.: WO2013/182147
PCT Pub. Date: Dec. 12, 2013

(65) Prior Publication Data
US 2015/0304985 A1 Oct. 22, 2015

(30) Foreign Application Priority Data

Oct. 18, 2012 (CN) .......................... 2012 1 0396171

(51) Int. Cl.
*H04W 64/00* (2009.01)
*H04W 4/02* (2009.01)
*G01S 19/49* (2010.01)

(52) U.S. Cl.
CPC ............ *H04W 64/006* (2013.01); *G01S 19/49* (2013.01); *H04W 4/027* (2013.01); *H04W 64/00* (2013.01)

(58) Field of Classification Search
None
See application file for complete search history.

(56) References Cited

U.S. PATENT DOCUMENTS

| 2010/0253503 A1* | 10/2010 | Juang | G01S 19/34 340/539.1 |
| 2013/0102268 A1* | 4/2013 | Wang | G01S 19/34 455/343.2 |
| 2016/0007405 A1* | 1/2016 | Ishihara | H04W 76/048 455/456.6 |

FOREIGN PATENT DOCUMENTS

| CN | 1914517 A | 2/2007 |
| CN | 101464155 | 6/2009 |

(Continued)

OTHER PUBLICATIONS

Jeongyeup Paek, Joongheon Kim, Ramesh Govindan "Energy-Efficient Rate-Adaptive GPS-based Positioning for Smartphones"—MobiSys'10, Jun. 15-18, 2010, San Francisco, California, USA. (16 pages).*

(Continued)

*Primary Examiner* — Kimberly A Williams
(74) *Attorney, Agent, or Firm* — Thomas Horstemeyer, LLP

(57) ABSTRACT

The embodiment of the present document provides a mobile terminal and a method for obtaining location information about a mobile terminal. The method for obtaining location information about the mobile terminal comprises: turning on a satellite locating module of the mobile terminal, turning off the satellite locating module after current location information about the mobile terminal is obtained, and regarding the current location information as initial location information; a sensing module of the mobile terminal collecting motion information about the mobile terminal, and calculating variation of displacement of the mobile terminal according to the motion information; and obtaining actual location information about the mobile terminal according to the initial location information and the variation of displacement of the mobile terminal.

10 Claims, 3 Drawing Sheets

Turn on a satellite locating module of the mobile terminal to obtain current location information about the mobile terminal and then turn off, and the current location information is regarded as initial location information — 101

A sensing module of the mobile terminal collects motion information about the mobile terminal, and calculates variation of displacement of the mobile terminal according to the motion information — 102

Actual location information about the mobile terminal is obtained according to the initial location information and the variation of displacement of the mobile terminal — 103

(56) References Cited

FOREIGN PATENT DOCUMENTS

| | | |
|---|---|---|
| CN | 102169182 | 8/2011 |
| CN | 102243315 A | 11/2011 |
| CN | 102901975 A | 1/2013 |
| JP | S63108285 | 5/1988 |
| JP | H02212713 | 8/1990 |
| JP | H06111196 | 4/1994 |
| JP | 2001059738 | 3/2001 |
| JP | 2006242578 | 9/2006 |
| JP | 2006279266 | 10/2006 |
| JP | 2010038712 | 2/2010 |
| JP | 2010038798 | 2/2010 |
| JP | 2011149925 | 8/2011 |
| JP | 2011164089 | 8/2011 |

OTHER PUBLICATIONS

International Search Report for PCT/CN2013/079701 mailed on Oct. 10, 2013.

* cited by examiner a   The device acceleration
a'  The horizontal component of the device acceleration
ax  The X-direction component of the device acceleration
ay  The Y-direction component of the device acceleration

MOBILE TERMINAL AND METHOD FOR OBTAINING LOCATION INFORMATION ABOUT MOBILE TERMINAL

CROSS-REFERENCE TO RELATED APPLICATIONS

This application is the 35 U.S.C. §371 national stage of PCT Application No. PCT/CN2013/079701, filed Jul. 19, 2013, which is herein incorporated by reference in its entirety and which also claims priority to, and the benefit of, Chinese Patent Application No. 201210396171.1, filed Oct. 18, 2012, which is herein incorporated by reference in its entirety.

TECHNICAL FIELD

The present document relates to the wireless communication field, and in particular, to a mobile terminal and a method for obtaining location information about a mobile terminal.

BACKGROUND

Because of the characteristics, such as all-weather, high-accuracy and automatic measuring, possessed by the global positioning system (GPS) technology, as the advanced measurement means and new productivity, it had already been integrated into various application fields, such as the national economic construction, the national defense construction and the social development.

Along with the end of cold war and the flourishing development of the global economy, the U.S. government announce to cancel the SA policy during the year 2000 to year 2006, on the premise of guaranteeing the U.S.A. national security not at risk, and the GPS civil signal precision is improved in the world wide, and the precision to locate the simple point by using the C/A code is raised to 10 meters from 100 meters, which will further promote the application of the GPS technology, raise the productivity, the working performance, the scientific level and the living quality of people, and stimulate the growth of the GPS market.

The main function of the assisted global positioning system (A-GPS) technology is to be able to provide the high-accuracy location information for the terminal user. After the mobile operator adopts the location service based on the A-GPS locating technology, the terminal user can know the current position of oneself or others conveniently and swiftly, which is especially suitable for the vehicle tracing and the navigation system and the vehicles with special tasks (armor cash carrier, ambulance, fire vehicle, etc.), and is able to increase the vehicle security, the transportation efficiency and the service quality by a large margin. At present, as the domestic mobile communication market is growing day by day, especially along with the coming of the commercial usage of 3G, China Mobile and China Unicom have all made and put out their own A-GPS schemes.

The product functions of the mobile terminals are more and more comprehensive at present, and most mobile terminals have the satellite positioning function, such as the GPS, the A-GPS, etc., and the user can know one's own location at any time. But the satellite locating module, such as the GPS module or the A-GPS module, needs to frequently read the location information along with the movement of the user and the constant change of the location, which leads to the problems, for example, the power consumption of the satellite locating module, such as the GPS module or the A-GPS module, is greater, the data updating will be delayed, etc.

SUMMARY

The embodiment of the present document provides a mobile terminal and a method for obtaining location information about a mobile terminal, which can reduce the power consumption of the satellite locating module.

The embodiment of the present document provides a method for obtaining location information about a mobile terminal, comprising:

turning on a satellite locating module of the mobile terminal, turning off the satellite locating module after current location information about the mobile terminal is obtained, and regarding the current location information as initial location information;

a sensing module of the mobile terminal collecting motion information about the mobile terminal, and calculating variation of displacement of the mobile terminal according to the motion information; and obtaining actual location information about the mobile terminal according to the initial location information and the variation of displacement of the mobile terminal.

Preferably, the method further comprises: periodically turning on the satellite locating module of the mobile terminal to obtain the current location information of the mobile terminal, updating the initial location information, and setting the variation of displacement as zero.

Preferably, the step of periodically turning on the satellite locating module of the mobile terminal comprises:

starting a timer when the satellite locating module is turned off, and turning on the satellite locating module when time reaches a preset time threshold value;

or judging whether the variation of displacement reaches a preset displacement threshold value; and if yes, then turning on the satellite locating module.

Preferably, the motion information comprises: acceleration information and initial velocity information.

Preferably, the step of collecting the initial velocity information of the mobile terminal comprises:

judging a motion state of the mobile terminal at an initial location; if being in an static state, then the initial velocity being zero; if being in a motion state, then calculating an initial velocity of a present period according to the variation of displacement of a last period and the acceleration information obtained in the last period.

Preferably, the method further comprises a correction step to the initial velocity after calculating the initial velocity; wherein, the correction step comprises:

judging whether a difference value, between the variation of displacement of the last period obtained through the calculation via the motion information and the variation of displacement obtained directly through acquiring the location information twice by the satellite locating module, is within a preset range; if yes, then no need to correct the initial velocity; if not, then re-calculating the initial velocity.

Preferably, the step of calculating displacement changing information of the mobile terminal through the motion information specifically comprises:

decomposing the acceleration and the initial velocity in a longitude direction, a latitude direction and a height direction; and calculating the variation of displacement of the mobile terminal in the longitude direction, the latitude direction and the height direction according to an acceleration component and an initial velocity component decomposed in the longitude direction, the latitude direction and the height direction.

The embodiment of the present document provides a mobile terminal, comprising: a satellite locating module, a sensing module, a control module and a location information processing module; wherein, the satellite locating module is configured to: obtain current location information about the mobile terminal, and transmit the location information to the location information processing module;

the control module is configured to: turn on the satellite locating module, and turn off the satellite locating module after the satellite locating module completes obtaining the information;

the sensing module is configured to: collect motion information about the mobile terminal, and calculate variation of displacement of the mobile terminal according to the motion information, and transmit the variation of displacement to the location information processing module; and the location information processing module is configured to: obtain actual location information about the mobile terminal through processing the initial location information and the variation of displacement of the mobile terminal.

Preferably, the control module is further configured to: control the satellite locating module periodically turn on to obtain the current location information of the mobile terminal, update the initial location information, and control the sensing module to set the variation of displacement as zero.

Preferably, the satellite locating module is a global positioning system (GPS) module or an assisted global positioning system (AGPS) module.

Preferably, the control module is configured to periodically turn on the satellite locating module of the mobile terminal by the following mode:

starting a timer when the satellite locating module is turned off, and turning on the satellite locating module when time reaches a preset time threshold value;

or judging whether the variation of displacement reaches a preset displacement threshold value; and if yes, then turning on the satellite locating module.

Preferably, the motion information comprises: acceleration information and initial velocity information.

Preferably, the sensing module is configured to collect the initial velocity information of the mobile terminal by the following mode:

judging a motion state of the mobile terminal at an initial location; if being in an static state, then the initial velocity being zero; if being in a motion state, then calculating an initial velocity of a present period according to the variation of displacement of a last period and the acceleration information obtained in the last period.

Preferably, the sensing module is further configured to:

judge whether a difference value, between the variation of displacement of the last period obtained through the calculation via the motion information and the variation of displacement obtained directly through acquiring the location information twice by the satellite locating module, is within a preset range; if yes, then need not to correct the initial velocity; if not, then re-calculate the initial velocity.

Preferably, the sensing module is configured to calculate the displacement changing information of the mobile terminal by the following mode:

decomposing the acceleration and the initial velocity in a longitude direction, a latitude direction and a height direction; and calculating the variation of displacement of the mobile terminal in the longitude direction, the latitude direction and the height direction according to an acceleration component and an initial velocity component decomposed in the longitude direction, the latitude direction and the height direction.

The embodiment of the present document provides a method for obtaining location information about a mobile terminal, which can reduce the power consumption of the module for obtaining the location information about the mobile terminal Wherein, the satellite locating module is turned off after the location information about the mobile terminal is obtained, then the motion information about the mobile terminal is collected through the sensing module of the mobile terminal, and the displacement changing information of the mobile terminal is calculated through the motion information, and then the actual location information is obtained according to the initial location information and the displacement changing information, to reduce the power consumption of the satellite locating module without requirement on obtaining the current location information of the mobile terminal and updating frequently by using the satellite locating module.

In addition, the terminal only needs to calculate the displacement changing information through the motion information about the mobile terminal, and thus calculates the actual location information, which can reduce the appearance of the data update delay and improve the accuracy of the location information after the frequent updating and obtaining the location information are avoided.

PREFERRED EMBODIMENTS OF THE PRESENT DOCUMENT

The embodiment of the present document is described in detail with reference to the accompanying drawings hereinafter. It should be illustrated that, in the case of not conflicting, the embodiments in the present application and features in these embodiments can be combined with each other.

In the embodiment of the present document, the mobile terminal detects the motion state of the terminal itself and calculates the displacement variation information, and then calculates the actual location of the mobile terminal by combining with the initial location information read by the satellite locating module (such as the GPS or the A-GPS module), to prevent the module for obtaining the location information (such as the GPS or the A-GPS module) from frequently reading the current location information of the mobile terminal, reducing the power consumption of the satellite locating module (such as the GPS or the A-GPS module).

The embodiment of the present document is described in detail with reference to the accompanying drawings hereinafter.

Embodiment One

Figure 1:
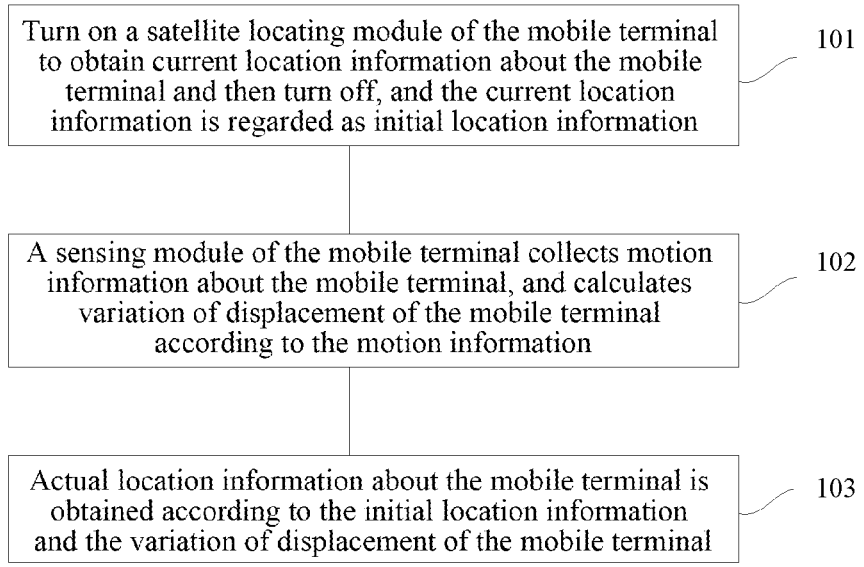
FIG. 1 is a basic flow chart of a method for obtaining location information about a mobile terminal according to embodiment one of the present document.

Please refer to FIG. 1, a method for obtaining location information about a mobile terminal according to the present embodiment includes the following steps.

In step 101, a satellite locating module of the mobile terminal is turned on, the satellite locating module is turned off after current location information about the mobile terminal is obtained, and the current location information is regarded as initial location information.

In step 102, a sensing module of the mobile terminal collects motion information about the mobile terminal, and calculates variation of displacement of the mobile terminal according to the motion information.

In step 103, actual location information about the mobile terminal is obtained according to the initial location information and the variation of displacement of the mobile terminal.

The method of the present embodiment can further include: periodically turning on the satellite locating module of the mobile terminal to obtain the current location information of the mobile terminal, updating the initial location information, and setting the variation of displacement as zero.

The above-mentioned period for turning on the satellite locating module of the mobile terminal can be preset, the displacement variation information of the mobile terminal can be calculated through obtaining the motion information about the mobile terminal and according to the motion information before starting the next period, and then the actual location of the mobile terminal at the corresponding moment is calculated according to the initial location information and the displacement changing information, to reduce the frequency of obtaining the location information and reduce the power consumption of the corresponding module.

In the method for obtaining the location information about the mobile terminal of the present embodiment, the procedure of periodically turning on the satellite locating module of the mobile terminal to obtain the current location information of the mobile terminal can include:

starting a timer when the satellite locating module is turned off, and turning on the satellite locating module when time reaches a preset time threshold value;

or judging whether the variation of displacement reaches a preset displacement threshold value; and if yes, then turning on the satellite locating module.

For example, the satellite locating module can be set to turn on every minute to obtain the current location information, and the satellite locating module also can be set to turn on every kilometer to obtain the current location information of the mobile terminal. In this way, the satellite locating module of the mobile terminal is in the closing or dormant state in most of the time, which can reduce the power consumption of the satellite locating module.

The motion information obtained in the above-mentioned step 102 can include: acceleration information and initial velocity information.

The acceleration information obtained in the above-mentioned step 102 can include: the acceleration information of the mobile terminal obtained through the acceleration sensor of the mobile terminal.

There are more and more functions of the mobile terminal at present, which support, on the hardware, the sensors of various applications, such as GPS, acceleration, proximity, electronic compass, etc., and support Wi-Fi, BT, NFC, etc., on the transmission technology; and the GPS (AGPS) has already been widely used on the intelligence terminal devices, such as, the mobile phone, the tablet computer, etc. In the method of the present embodiment, the sensor of the mobile terminal can be utilized to obtain the motion information, such as, the acceleration information and the initial velocity information.

Taking obtaining the location information with the GPS or the AGPS and obtaining the acceleration information with the sensor as the example, the GPS or AGPS module obtains the current location information as the initial location information; when the mobile terminal moves, the sensor obtains the acceleration information and the initial velocity information of the mobile terminal and calculates the variation of displacement, and then can calculate the location information at the corresponding moment according to the initial location information. It is unnecessary for the mobile terminal to use the GPS or AGPS module to obtain the current location information for update again, reducing the frequency of reading the data by the GPS or AGPS module and reducing the power consumption of the module, and the delay of the data update is reduced and the accuracy grade of the location information is improved because the number of updating the data is reduced.

The GPS (AGPS) module generally reads the data once every second, and there is the problem that the power consumption is big and the location update is delayed. The power consumption of the sensor module is generally less than $\frac{1}{10}$ of the GPS (AGPS) module. By using the sensor assisted GPS (AGPS) module, the power consumption of the GPS (AGPS) module can be reduced through reducing the frequency of reading the data by the GPS (AGPS) module; and the location information can be updated at a high frequency at the same time, which solves the problem of the data update delay. Regarding the device location read by the GPS (AGPS) module as the original point, the sensor detects the acceleration of the device, calculates the displacement increment of the device, and thus calculates the actual location of the device at the corresponding moment, and updates the location information of the device in time; the GPS (AGPS) module reads the location information again, if it is read successfully, then the initial location of the device is updated (that is, the original point of the last displacement), the displacement increment is set as 0, and the displacement increment is re-calculated, by this circulation.

The above-mentioned obtaining the initial velocity information of the mobile terminal includes:

judging a motion state of the mobile terminal at an initial location; if being in an static state, then the initial velocity being zero; if being in a motion state, then calculating an initial velocity of a present period according to the variation of displacement of a last period and the acceleration information obtained in the last period.

When the satellite locating module of the mobile terminal, during the static state, turns on the satellite locating module, then the initial velocity is zero; if it is in the motion state, it can calculate the final velocity of the last period according to the variation of displacement and the acceleration of the last period, thus obtaining the initial velocity of the present period.

The method of the present embodiment also includes the correction to the initial velocity after calculating the initial velocity.

The correction includes:

judging whether a difference value, between the variation of displacement of the last period obtained through the calculation via the motion information and the variation of displacement obtained directly through acquiring the location information twice by the satellite locating module, is within a preset range; if yes, then no need to correct the initial velocity; if not, then re-calculating the initial velocity.

Figure 2:
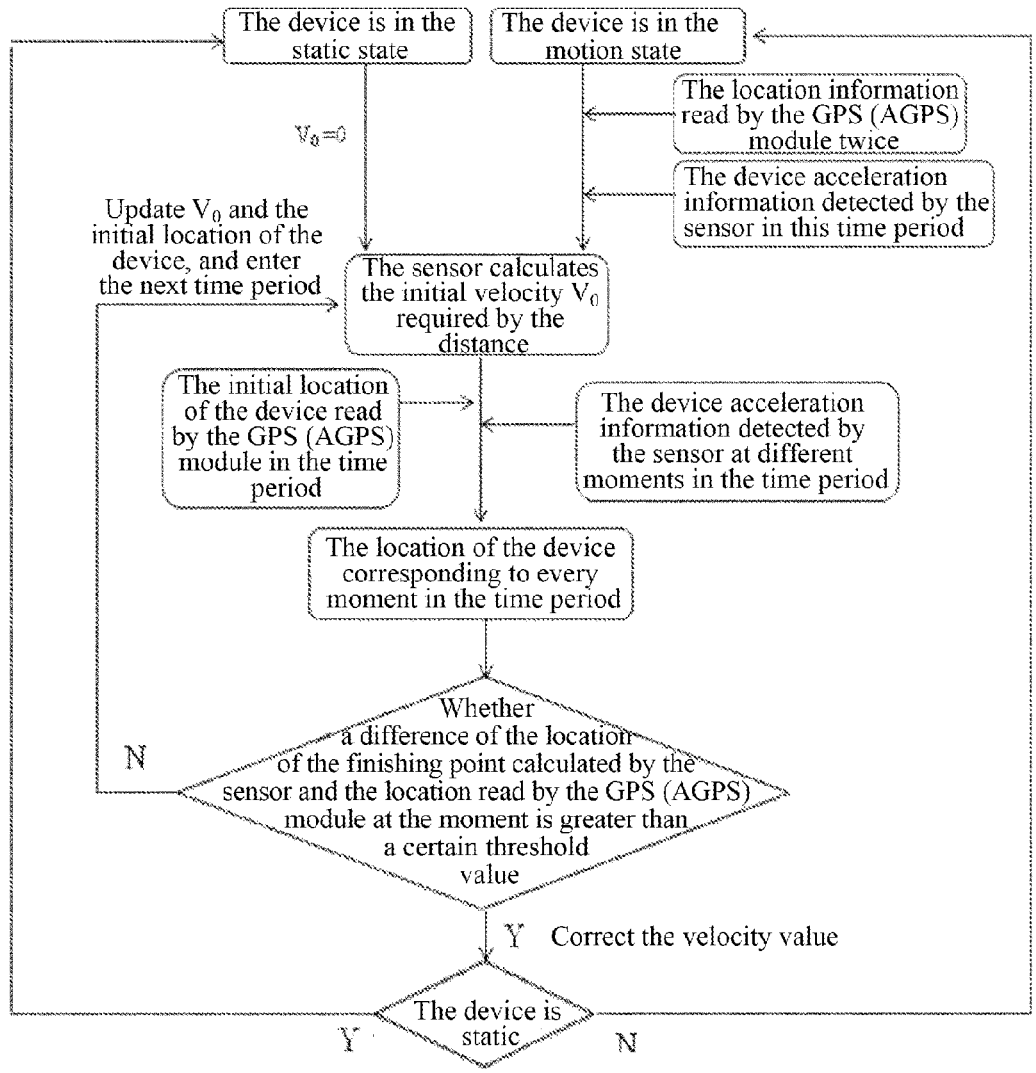
FIG. 2 is a flow chart of obtaining an initial velocity according to embodiment one of the present document.

As shown in FIG. 2, the obtaining of the initial velocity V0 can be: judging the motion state of the device by using the sensors, such as, the acceleration sensor, etc. If the device turns on the locating application such as, the GPS, etc. in the static state, then V0 is 0, and the velocity at corresponding moment is calculated in real time and recorded according to the acceleration detected by the sensor. If the locating application, such as the GPS, etc., is turned on when the device moves, the displacement is calculated by using the location information read by the GPS (AGPS) module twice, and the velocity at corresponding moment is calculated by the displacement calculation formula according to the acceleration information of the device detected by the sensor. Errors exist in both of the above-mentioned two situations, and the initial velocity can be corrected constantly by the corresponding policy. For example, when the difference of the location information read by the (AGPS) module and the data calculated by the sensor is greater than a certain threshold value, the corresponding initial velocity is re-calculated according to the location information read by the (AGPS) module this time and the last time and the acceleration information of the device detected by the sensor. In order to reduce the error, when calculating the initial velocity, the time interval of the location information read by the GPS (AGPS) module twice can be reduced to the best.

After obtaining the acceleration information and the initial velocity information, in the above-mentioned step 102, the displacement changing information of the mobile terminal calculated according to the motion information includes:

decomposing the acceleration and the initial velocity in a longitude direction, a latitude direction and a height direction; and calculating the variation of displacement of the mobile terminal in the longitude direction, the latitude direction and the height direction according to an acceleration component and an initial velocity component decomposed in the longitude direction, the latitude direction and the height direction.

Figure 3:
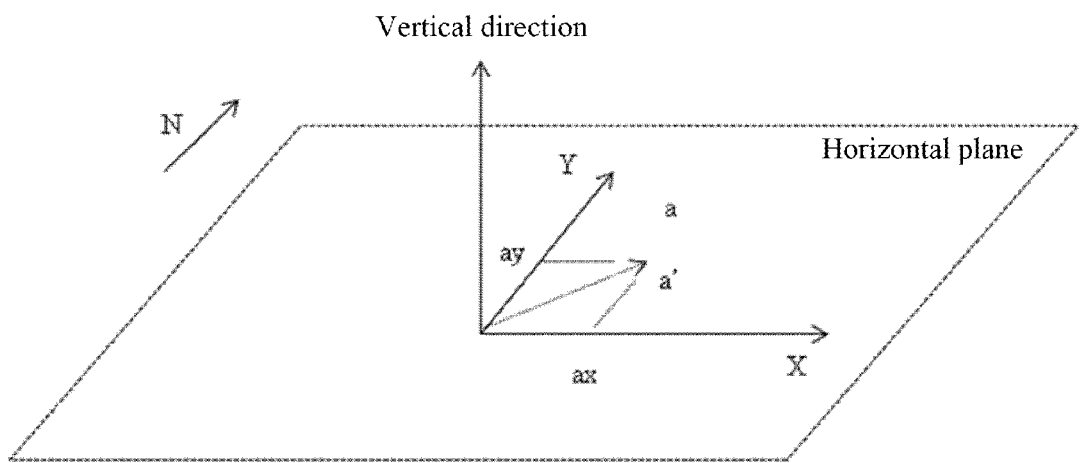
FIG. 3 is a diagram of decomposing an acceleration according to embodiment one of the present document.

Similarly, taking obtaining the location information with the GPS or the AGPS and obtaining the acceleration information with the sensor as the example, as shown in FIG. 3: the acceleration of the device can be monitored in real time through the sensor, such as, the acceleration, etc., and the acceleration is decomposed into the horizontal plane component (X axle, Y axle direction) and the vertical component (Z axis direction). By combining with the sensors, such as the electronic compass, etc., the coordinates of the sensors, such as the acceleration, etc., can be connected with the earth location coordinate; the acceleration and the initial velocity V0 are decomposed into the longitude and latitude direction and the height direction respectively; the displacement increments of the longitude and latitude direction and the height direction are calculated, and converted into the displacement increments in the longitude and latitude and the altitude direction; and the actual location of the device at the corresponding moment within the time period between the two readings by the GPS (AGPS) module by combining with the initial location of the device (the device location detected by the GPS or the AGPS). The direction sensor, such as, the electronic compass, etc., can also not be used: during the initialization, the relative relation of the coordinate of the sensor, etc., such as, the acceleration, etc., and the earth location coordinate is calculated, the azimuthal variation situation of the device is monitored through the sensor, such as the acceleration, etc., and the relative relation of the coordinate of the sensor, etc., such as, the acceleration, etc., and the earth location coordinate is constantly recorded.

Figure 4:
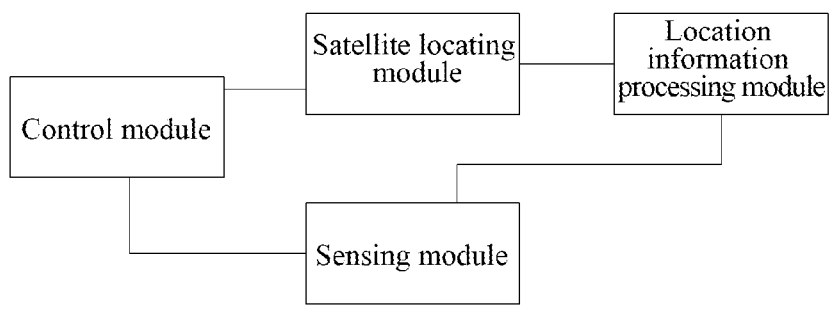
FIG. 4 is a structure diagram of a mobile terminal according to embodiment one of the present document.

As shown in FIG. 4, corresponding to the above-mentioned method for obtaining location information about a mobile terminal, the present embodiment further provides a mobile terminal, comprising: a satellite locating module, a sensing module, a control module and a location information processing module; wherein, the satellite locating module is configured to: obtain current location information about the mobile terminal, and transmit the location information to the location information processing module;

the control module is configured to: turn on the satellite locating module, and turn off the satellite locating module after the satellite locating module completes obtaining the information;

the sensing module is configured to: collect motion information about the mobile terminal, and calculate variation of displacement of the mobile terminal according to the motion information, and transmit the variation of displacement to the location information processing module; and the location information processing module is configured to: obtain actual location information about the mobile terminal through processing the initial location information and the variation of displacement of the mobile terminal.

The above-mentioned control module is further configured to: control the satellite locating module periodically turn on to obtain the current location information of the mobile terminal, update the initial location information, and control the sensing module to set the variation of displacement as zero.

The satellite locating module is a global positioning system (GPS) module or an assisted global positioning system (AGPS) module.

The motion information collection module in the present embodiment can be a sensor.

Embodiment Two

Based on the method for obtaining location information about the mobile terminal in the embodiment one, the present embodiment regards configuring the GPS or AGPS module mobile phone as the example. The device location read by the GPS (AGPS) module is used as the original point, the device acceleration is detected by using the acceleration sensor and the electronic compass, the device displacement increment is calculated, and thus the actual location of the device at the corresponding moment is calculated, and the device location information is updated in time. The GPS (AGPS) module reads the location information again, and the initial location of the device is updated (that is, the original point of the previous displacement), the displacement increment is set as 0, and the displacement increment is re-calculated, and circulate in this way. The specific time threshold value or displacement threshold value of the location information read by the GPS (AGPS) module can be set up, to make the reading frequency a bit lower, for example, reading once every minute, which can enable the GPS (AGPS) module in the dormant state with the low power consumption in most of the time.

Obtaining the device motion information mainly includes: obtaining and processing the acceleration, and obtaining the initial velocity.

For the obtaining and processing of the acceleration:
the device acceleration is obtained through the acceleration sensor, the acceleration is decomposed into the horizontal plane component and the vertical component (the present embodiment does not consider the change in the height direction of the device, while only monitors the displacement of the horizontal direction); by combining with the electronic compass, the horizontal component of the acceleration is decomposed into ax and ay in the longitude and latitude direction, that is, X and Y direction; the decomposition diagram of the device acceleration is as FIG. 2.

The frequency of reading the acceleration by using the acceleration sensor is set as reading once every 10 ms, that is, t=10 ms.

The device acceleration is read respectively as: a1, a2, . . . an (it is assumed that the acceleration value is read n times by the acceleration sensor during the two reading periods of the GPS).

The direction components of X-axis are respectively: ax1, ax2 . . . axn.

The direction components of Y-axis are respectively: ay1, ay2 . . . ayn.

For the obtaining of the initial velocity:
the obtaining of the initial velocity V0 is: judging the motion state of the device by using the sensors, such as the acceleration, etc.; if the device in the static state turns on the locating application, such as, the GPS, etc., then V0 is 0, and the velocity at corresponding moment is calculated in real time and recorded according to the acceleration detected by the sensor; if the locating application, such as, the GPS, etc., is turned on when the device moves, the displacement is calculated by using the location information read by the GPS (AGPS) module twice, and then the velocity at corresponding moment is calculated according to the acceleration information of the device detected by the acceleration sensor and the electronic compass. Errors exist in both of the above-mentioned two situations, and the initial velocity can be corrected constantly by the corresponding policy. For example, when the difference of the location information read by the (AGPS) module and the data calculated by the acceleration sensor and the electronic compass is greater than a certain threshold value, the corresponding initial velocity is re-calculated according to the location information read by the (AGPS) this time and the last time and the acceleration information of the device detected by the acceleration sensor and the electronic compass. The obtaining procedure of the device velocity is as FIG. 3.

When the device is under the static state, V0x=V0y=V0=0.

When the device is under the motion state, the gaining mode for the V0x and V0y is as follows: (the conversions of the longitude and latitude unit and the distance unit are involved hereinafter, which are omitted in the present text.)

Assuming that the device locations read by the GPS (AGPS) module twice are at point A and point B respectively, the distance between the two points is AB; the reading frequency of the GPS (AGPS) module is once every minute, that is, the time interval T for reading the point A and point B=60 s; assuming that the frequency of reading the acceleration by using the acceleration sensor is reading once for every 10 ms, that is, t=10 ms.

ABx is the component of the X-axis direction, and ABy is the component of the Y-axis direction, then:

$$ABx = V0x \times \Delta t + (V0x + \tfrac{1}{2}ax1 \times \Delta t)\Delta t + \ldots (V0x + ax1 \times \Delta t + \ldots \tfrac{1}{2}axn \times \Delta t)\Delta t \quad (1)$$

(ax1, ax2, . . . , axn are the X-axis components of the acceleration values read by the acceleration sensor at different moments within the T period).

$$ABy = V0y \times \Delta t + (V0y + \tfrac{1}{2}ay1 \times \Delta t)\Delta t + \ldots (V0y + ay1 \times \Delta t + \ldots \tfrac{1}{2}ayn \times \Delta t)\Delta t \quad (2)$$

(ay1, ay2, . . . , ayn are the Y-axis components of the acceleration values read by the acceleration sensor at different moments within the T period).

V0x and V0y can be gained through the above ① and ②.

The velocity at the final moment in the T period is the initial velocity of the next T period, that is:
the initial velocity of the X-axis direction in the next T period is:

$$V0x + ax1 \times \Delta t + \ldots axn \times \Delta t;$$

the initial velocity of the Y-axis direction in the next T period is:

$$V0y + ay1 \times \Delta t + \ldots ayn \times \Delta t.$$

The correction policy for the initial velocity:
the displacement increment in the period calculated by the sensor is compared with the location distance read by the GPS (AGPS) module; and if it is greater than 2 m, then the initial velocity is corrected. The correction mode can adopt obtaining the initial velocity again, and the method is the same with the above-mentioned mode for obtaining the initial velocity.

The displacement increment of the device is calculated after obtaining the acceleration information and the initial velocity information, and then the actual position of the device is calculated according to the initial location information, and the specific procedure is as follows.

In the reading period T of the GPS (AGPS) module, the location P of the device can be determined by using the location S0 read when the reading period T of the GPS (AGPS) is started and the displacement increment ΔS calculated by the sensor:

$$P = S0 + \Delta S.$$

Assuming that Px and Py are the locations of the device at the X and Y directions; S0x and S0y are the initial locations of the starting point of the T period at the X and Y directions; and ΔSx and ΔSy are the displacement increments at the X and Y directions. Then,
the location of the device when reading the acceleration for the kth time is:

$$Px = S0x + \Delta Sx;$$

$$\Delta Sx = V0x \times \Delta t + (V0x + \tfrac{1}{2}ax1 \times \Delta t)\Delta t + \ldots (V0x + ax1 \times \Delta t + \ldots \tfrac{1}{2}axk \times \Delta t)\Delta t;$$

$$Py = S0y + \Delta Sy;$$

$$\Delta Sy = V0y \times \Delta t + (V0y + \tfrac{1}{2}ay1 \times \Delta t)\Delta t + \ldots (V0y + ay1 \times \Delta t + \ldots \tfrac{1}{2}ayk \times \Delta t)\Delta t.$$

The device location information calculated every time is updated in real time, and the update frequency of the device location information can reach one time every 10 ms. The continuous motion path can be provided for the user, which solves the experience problems, such as the data update delay, etc.

After the T period is over, the GPS (AGPS) module reads the device location again, and the newly read device location is used as the initial location of the next period. The newly read device location is compared with the location calculated by the sensor, to determine whether to correct the initial velocity.

Through the above-mentioned methods, the GPS (AGPS) module can be enabled be in the dormant state with low power consumption in most of the time, to reduce the power consumption of the GPS (AGPS) module; which can update the location information with a high frequency at the same time and solve the data update delay problem.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The above description is the detailed explanation to the embodiment of the present document by combining with the preferable execution modes, while cannot be believed that the execution of the embodiment of the present document is only limited to these explanations. For those skilled in the art to which the present document belongs, several simple deductions or replacements also can be made without departing from the conception of the embodiment of the present document, and all the deductions or replacements should be regarded to be embodied in the scope of the accompanying claims.

INDUSTRIAL APPLICABILITY

The embodiment of the present document can reduce the power consumption of the module for obtaining the location information about the mobile terminal.

I claim:

1. A method for obtaining location information about a mobile terminal, comprising:
   turning on a satellite locating module of the mobile terminal, turning off the satellite locating module after current location information about the mobile terminal is obtained, and regarding the current location information as initial location information;
   a sensing module of the mobile terminal collecting motion information about the mobile terminal, and calculating variation of displacement of the mobile terminal according to the motion information;
   obtaining actual location information about the mobile terminal according to the initial location information and the variation of displacement of the mobile terminal;
   wherein, the motion information comprises:
   acceleration information and initial velocity information;
   further comprising a correction step to the initial velocity after calculating the initial velocity; wherein, the correction step comprises:
   judging whether a difference value, between the variation of displacement of the last period obtained through the calculation via the motion information and the variation of displacement obtained directly through acquiring the location information twice by the satellite locating module, is within a preset range; if yes, then no need to correct the initial velocity; if not, then re-calculating the initial velocity.

2. The method according to claim 1, further comprising: periodically turning on the satellite locating module of the mobile terminal to obtain the current location information of the mobile terminal, updating the initial location information, and setting the variation of displacement as zero.

3. The method according to claim 2, wherein, the step of periodically turning on the satellite locating module of the mobile terminal comprises:
   starting a timer when the satellite locating module is turned off, and turning on the satellite locating module when time reaches a preset time threshold value;
   or
   judging whether the variation of displacement reaches a preset displacement threshold value; and if yes, then turning on the satellite locating module.

4. The method according to claim 1, wherein, the step of collecting the initial velocity information of the mobile terminal comprises:
   judging a motion state of the mobile terminal at an initial location; if being in an static state, then the initial velocity being zero; if being in a motion state, then calculating an initial velocity of a present period according to the variation of displacement of a last period and the acceleration information obtained in the last period.

5. The method according to claim 4, wherein, the step of calculating displacement changing information of the mobile terminal through the motion information comprises:
   decomposing the acceleration and the initial velocity in a longitude direction, a latitude direction and a height direction; and
   calculating the variation of displacement of the mobile terminal in the longitude direction, the latitude direction and the height direction according to an acceleration component and an initial velocity component decomposed in the longitude direction, the latitude direction and the height direction.

6. A mobile terminal, comprising a processor, configured to:
   obtain current location information about the mobile terminal through a satellite locating module comprising a global positioning system (GPS) module or an assisted global positioning system (AGPS) module;
   turn on the satellite locating module, and turn off the satellite locating module after the information is obtained;
   collect motion information about the mobile terminal through a sensor, and calculate variation of displacement of the mobile terminal according to the motion information; and
   obtain actual location information about the mobile terminal through processing the initial location information and the variation of displacement of the mobile terminal;
   wherein, the motion information comprises: acceleration information and initial velocity information;
   wherein, the processor is further configured to:
   judge whether a difference value, between the variation of displacement of the last period obtained through the calculation via the motion information and the variation of displacement obtained directly through acquiring the location information twice by the satellite locating module, is within a preset range; if yes, then need not to correct the initial velocity; if not, then re-calculate the initial velocity.

7. The mobile terminal according to claim 6, wherein, the processor is further configured to: control the satellite locating module to periodically turn on to obtain the current location information of the mobile terminal, update the initial location information, and set the variation of displacement as zero.

8. The mobile terminal according to claim 7, wherein, the processor is configured to periodically turn on the satellite locating module of the mobile terminal by the following mode:

starting a timer when the satellite locating module is turned off, and turning on the satellite locating module when time reaches a preset time threshold value;

or judging whether the variation of displacement reaches a preset displacement threshold value; and if yes, then turning on the satellite locating module.

9. The mobile terminal according to claim 6, wherein, the processor is configured to collect the initial velocity information of the mobile terminal by the following mode:

judging a motion state of the mobile terminal at an initial location; if being in an static state, then the initial velocity being zero; if being in a motion state, then calculating an initial velocity of a present period according to the variation of displacement of a last period and the acceleration information obtained in the last period.

10. The mobile terminal according to claim 9, wherein, the processor is configured to calculate the displacement changing information of the mobile terminal by the following mode:

decomposing the acceleration and the initial velocity in a longitude direction, a latitude direction and a height direction; and calculating the variation of displacement of the mobile terminal in the longitude direction, the latitude direction and the height direction according to an acceleration component and an initial velocity component decomposed in the longitude direction, the latitude direction and the height direction.

* * * * *